March 7, 1933. R. G. MEADER 1,900,574
FASTENING DEVICE FOR INHERENTLY RESILIENT ARTICLES
Filed July 15, 1931

Inventor
Russell G. Meader
by
W. H. Finckel
Attorney

Patented Mar. 7, 1933

1,900,574

UNITED STATES PATENT OFFICE

RUSSELL G. MEADER, OF DETROIT, MICHIGAN, ASSIGNOR TO SCOVILL MANUFACTURING COMPANY, OF WATERBURY, CONNECTICUT, A CORPORATION OF CONNECTICUT

FASTENING DEVICE FOR INHERENTLY RESILIENT ARTICLES

Application filed July 15, 1931. Serial No. 550,992.

This invention relates to a fastening device for inherently resilient articles, and more particularly to the assembly of a stud member of a separable fastener with an inherently resilient covering member such, for example, as a rubber floor mat for automobiles and other vehicles.

Although the invention will be described hereinafter in its application particularly to the attachment of inherently resilient rubber floor mats to the metallic floor plates of automobiles, it is to be understood that it is not intended to thereby limit its applicability, inasmuch as it is susceptible of use in other installations.

The object of the invention is to provide an assembly in which the fastener element, particularly a snap fastener stud member, is so associated with the inherently resilient article as to be held in predetermined desired relation therein and be capable of application to and removal from a supporting member along with said article.

The invention contemplates a fastener assembly, including an inherently resilient article carrying one element of a snap fastener and adapted to be mounted in predetermined relation upon a support carrying a complemental snap fastener element, the fastener element carried by the resilient article having a part extending through an opening in said article and held in desired relation to the article by frictional engagement of the wall of the opening with the part of the fastener element extending therethrough due to the inherent resiliency of the article and the tendency of such opening to contract upon the portion of the fastener element extending through the opening, all as will be explained hereinafter more fully and finally claimed.

Figure 1:
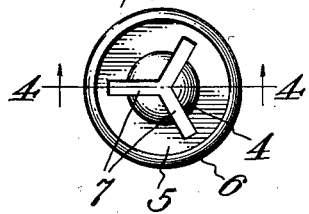
Figure 2:
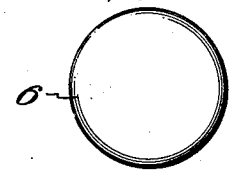
Figure 3:
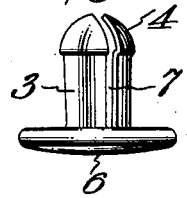
Figure 4:
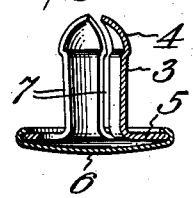
Figures 5, 6:
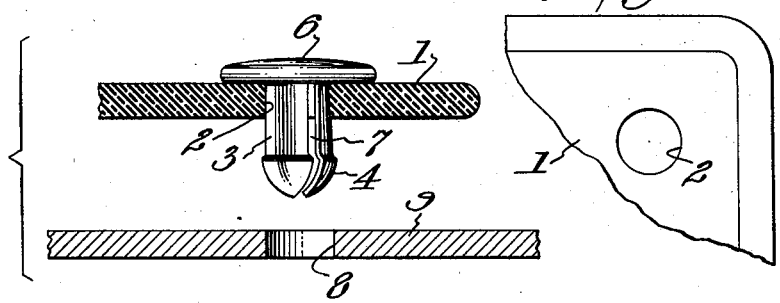
Figure 7:
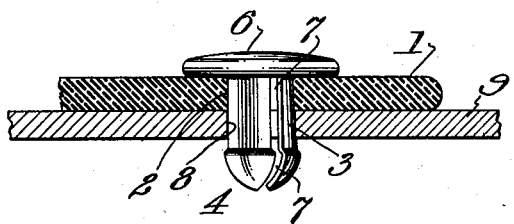
Figure 9:
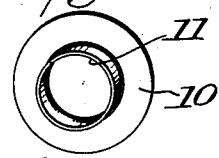
Figure 8:
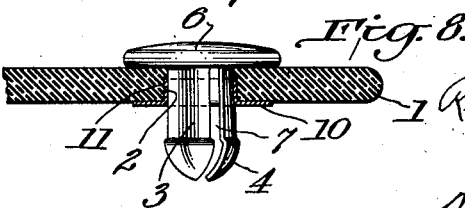

In the accompanying drawing illustrating the invention, in the several figures of which like parts are similarly designated, Figure 1 is a face view, Fig. 2 is a back view, Fig. 3 is a side elevation, and Fig. 4 is a section taken on the line 4—4 of Fig. 1, of a snap fastener stud element suitable for use in the assembly contemplated by the invention. Fig. 5 is a fragmentary plan view of one corner of an inherently resilient article, such as a rubber floor mat, forming an element of the assembly. Fig. 6 is a sectional elevation illustrating the complete assembly, the article with its fastener element being shown detached from the support. Fig. 7 shows the parts of Fig. 6 in attached relation. Fig. 8 illustrates a modification of the assembly in which a retaining washer is employed. Fig. 9 is a perspective view of the washer shown in Fig. 8.

Referring particularly to Figs. 5, 6 and 7, it will be seen that the inherently resilient article 1, shown as a rubber floor mat is provided with an opening 2 of such diameter as to frictionally engage the resilient shank 3 of a stud element. This stud element has an enlarged head 4 and a base flange 5, and to this base flange is preferably applied a finish cap 6. The head 4 and shank 3 of the stud member are preferably slitted as indicated at 7 so that the stud may form the resilient element of the separable fastener, a hole 8 drilled in the support or floor panel 9 being shown as providing the complemental fastener or socket element for cooperation therewith.

The stud element preferably has its shank 3 tapered, and of larger diameter adjacent to the head 4 than adjacent to the base flange 5, so as to assist in maintaining its desired position relatively to the article to which it is applied. This stud element is similar to that covered by the patent of John H. Goss, No. 1,727,819, granted Sept. 10, 1929, but includes as an additional part the cap 6 which provides an ornamental finish for the base flange of the stud element, which, in the present installation is arranged upon the exterior of the attached article.

In providing an installation including the assembly of the invention, the resilient article or mat is provided with a plurality of openings 2 so located as to register with the socket elements or holes 8 in the floor panel 9. Then one of the stud elements is inserted through each of the openings 2 in the mat. The resiliency of their shanks and the inherent resiliency of the mat permit the heads 4 of the stud elements to pass through the openings. The stud elements are so arranged relatively to the mat that the under surfaces of their caps 6 rest against the adjacent surface of the mat, as illustrated in Fig. 6. The inherent resiliency of the mat 1 will cause the walls of the openings 2 to contract upon and frictionally engage the shanks 3 of the stud elements after their heads 4 have passed through the openings, thus normally maintaining the stud elements in desired position relatively to the mat as shown. The taper of the shanks 3 of the stud elements and their resiliency also aid in this respect.

After the desired plurality of stud elements has been thus mounted in the mat 1, the mat is arranged upon the floor panel with the stud elements in substantial axial alignment with the socket holes 8 therein and pressure is applied to the caps 6 of the stud elements to force the heads 4 thereof through the holes or sockets 8 to attach the mat to the floor panel, as illustrated in Fig. 7, at the desired plurality of points necessary to hold it in fixed relation to the floor panel.

If slight irregularities in axial alignment of the stud elements and holes or sockets 8 occur, the inherent resiliency of the mat will permit sufficient movement of the stud elements to produce such alignment as will enable them to be inserted through the socket holes 8.

Although not necessary to proper arrangement of the stud element relatively to the resilient article 1, it may, at times, be desirable to augment the inherently resilient frictional engagement of the wall of the opening 2 with the shank 3 of the stud element by application of a washer to the shank, (see Figs. 8 and 9). This washer, in the form shown, has a flange 10 and a barrel 11 and is adapted to be forced over the head 4 of the stud member with its barrel 11 in frictional engagement with the shank and its flange 10 lying against the under side of the article or mat 1. If desired, the barrel 11 may be dispensed with, and the washer be of conventional flat form.

It will thus be seen, that the invention provides a fastener assembly which, in its preferred form, includes merely an inherently resilient article provided with a plurality of openings through which the stud elements are inserted and in which they are held in desired position by frictional engagement, and a support carrying or provided with complemental fastener elements with which those elements carried by the article may be removably engaged. Moreover, the inherent resiliency of the article provides not only for frictional engagement with the fastener elements carried thereby to hold these elements in desired position, but makes possible proper axial alignment of such elements with their complements in the support to which the article is attached.

Various changes and modifications are contemplated within the spirit of the invention and the scope of the following claims.

What I claim is:—

1. A fastener assembly, including an inherently resilient article provided with a preformed opening, a support to which said article is to be attached, a separable fastener stud element carried by said article and having a base and a resilient shank and head, the opening in said article being of substantially the same diamter as the diamter of said shank so as to closely fit said shank, said stud element having its shank extending through the opening in said article with its base arranged at one face of said article and its head adjacent to the other face of said article, the shank of said stud element being of greater length than the thickness of said article and said base and said head being normally of greater diameter than the diameter of said opening, and fastener means carried by said support and complemental to said stud element, said stud element being held in predetermined position relatively to said article, with its base at one face thereof, by frictional engagement of the wall of said opening with said shank due to the inherent resiliency of said article and the resiliency of said shank, inadvertent detachment of the stud element from the article being prevented by said head and base, and the length of said shank affording a means whereby said stud element may be engaged with the complemental fastener means of said support.

2. A fastener assembly, including an inherently resilient article provided with a preformed opening, a separable fastener element carried by said article and having a part extending through said opening, said fastener element being held in predetermined position relatively to said article by frictional engagement of the wall of said opening with said part due to the inherent resiliency of said article.

3. A fastener assembly, including an inherently resilient article provided with a preformed opening, a support to which said article is to be attached, a separable fastener element carried by said article and having a part extending through said opening, said fastener element being held in predetermined position relatively to said article by frictional engagement of the wall of said opening with said part due to the inherent resiliency of said article, said support provided with fastener means complemental to the fastener element carried by said article.

4. A fastener assembly, including an inherently resilient article, provided with a preformed opening, a separable fastener stud element carried by said article and having a shank extending through said opening, said stud element being held in predetermined position relatively to said article by frictional engagement of the wall of said opening with said shank due to the inherent resiliency of said article.

5. A fastener assembly, including an inherently resilient article provided with a preformed opening, a separable fastener element carried by said article and having a part of greater length than the thickness of said article extending through said opening, said fastener element being held in predetermined position relatively to said article by frictional engagement of the wall of said opening with said part due to the inherent resiliency of said article, the length of said part affording a means whereby it may be engaged with a complemental fastener element.

6. A fastener assembly, including an inherently resilient article provided with a preformed opening, a separable fastener stud element having a head, a base and a shank, said stud element carried by said article with its shank extending through said opening and having its base arranged at one face of said article and its head adjacent to the other face thereof, the shank of said stud being of greater length than the thickness of said article of said stud element being held in predetermined position relatively to said article by frictional engagement of the wall of said opening with said shank due to the inherent resiliency of said article, and inadvertent detachment of the stud element from the article being prevented by said head and base, the length of said shank affording a means whereby said head may be engaged with a complemental fastener element.

7. A fastener assembly, including an inherently resilient rubber mat having a preformed opening, a separable fastener stud element carried by said mat and having a resilient shank extending through said opening, said stud element being held in predetermined position relatively to said mat by frictional engagement of the wall of said opening with said shank due to the inherent resiliency of said mat.

8. A fastener assembly, including an inherently resilient rubber mat having a preformed opening, a separable fastener stud element carried by said mat and having a shank of greater length than the thickness of said article and extending through said opening, said stud element being held in predetermined position relatively to said mat by frictional engagement of the wall of said opening with said shank due to the inherent resiliency of said mat, the length of said shank affording a means whereby the stud element may be engaged with a complemental socket element.

In testimony whereof I have hereunto set my hand this 25th day of June A. D. 1931.

RUSSELL G. MEADER.

CERTIFICATE OF CORRECTION

Patent No. 1,900,574. March 7, 1933.

RUSSELL G. MEADER.

It is hereby certified that error appears in the printed specification of the above numbered patent requiring correction as follows: Page 3, line 27, claim 6, for "of" read "and"; and that the said Letters Patent should be read with this correction therein that the same may conform to the record of the case in the Patent Office.

Signed and sealed this 9th day May, A. D. 1933.

M. J. Moore (Seal) Acting Commissioner of Patents.